US012559417B2

(12) United States Patent
Chen et al.

(10) Patent No.: US 12,559,417 B2
(45) Date of Patent: Feb. 24, 2026

(54) GLASS-CERAMIC COMPOSITE MATERIAL

(71) Applicants: Ming Chi University of Technology, New Taipei (TW); CHANG GUNG MEMORIAL HOSPITAL, LINKOU, Taoyuan (TW)

(72) Inventors: Pin-Yi Chen, New Taipei (TW); Po-Liang Lai, Taoyuan (TW); Kuei-Chih Feng, New Taipei (TW); Chi-Shun Tu, New Taipei (TW); Chi-Yun Wang, New Taipei (TW); Yu-Jie Wu, New Taipei (TW); Shyang-Yih Kung, New Taipei (TW); Guan-Yi Hung, New Taipei (TW)

(73) Assignees: Ming Chi University of Technology, New Taipei (TW); CHANG GUNG MEMORIAL HOSPITAL, LINKOU, Taoyuan (TW)

( * ) Notice: Subject to any disclaimer, the term of this patent is extended or adjusted under 35 U.S.C. 154(b) by 525 days.

(21) Appl. No.: 18/121,342

(22) Filed: Mar. 14, 2023

(65) Prior Publication Data

US 2024/0025800 A1     Jan. 25, 2024

(30) Foreign Application Priority Data

Jul. 21, 2022   (TW) .................................. 111127436

(51) Int. Cl.
C03C 10/00      (2006.01)

(52) U.S. Cl.
CPC .......... *C03C 10/00* (2013.01); *C03C 2204/00* (2013.01)

(58) Field of Classification Search
CPC ... C03C 10/00; C03C 4/0014; C03C 10/0009; A61L 27/54; A61L 2300/604; A61L 2430/02
See application file for complete search history.

(56) References Cited

FOREIGN PATENT DOCUMENTS

CN      103979794 A   *   8/2014

* cited by examiner

*Primary Examiner* — Cameron K Miller
(74) *Attorney, Agent, or Firm* — WPAT, PC

(57) ABSTRACT

The present invention relates to a glass-ceramic composite material, which is a composite material with degradability and osteoconductivity, and is composed of $CaO$—$MgO$—$SiO_2$ (CMS glass)+$CaMgSi_2O_6$ (CMS ceramic) and $CaSO_4$ (CS ceramic). In addition to the $CaO$—$MgO$—$SiO_2$ glass, this synthesized composite material mainly includes two ceramics of $CaMgSi_2O_6$ and $CaSO_4$ in crystalline phase, wherein, both the CMS glass and CMS ceramic have high mechanical strength, biocompatibility and osteoconductivity, while $CaSO_4$ has the characteristics of rapid degradation to promote bone ingrowth.

1 Claim, 6 Drawing Sheets

GLASS-CERAMIC COMPOSITE MATERIAL

CROSS-REFERENCE TO RELATED APPLICATION

This application claims the priority of Taiwanese patent application No. 111127436, filed on Jul. 21, 2022, which is incorporated herewith by reference.

BACKGROUND OF THE INVENTION

1. Field of the Invention

The present invention relates to a glass-ceramic composite material, in particular to a composite material of CaO—MgO—SiO$_2$ glass+CaMgSi$_2$O$_6$ ceramic (which are referred to as CMS glass-ceramic) and CaSO$_4$ (CS ceramic).

2. The Prior Arts

In modern medicine, the medical treatment behavior of placing biomedical implants into living organisms to replace the original joints, intervertebral discs or tooth roots, etc., is already a quite mature technology. Thus, researches related to the structure and materials of various biomedical implants have also become one of the current development priorities in the biomedical field.

The introduction of autologous materials (human bone) and allogeneic materials (animal bone) as substitutes for bone grafts first appeared in the 1970s, however, synthetic materials (e.g., hydroxyapatite, tricalcium phosphate, calcium sulfate, and bioactive glass) have commercial advantages because of their lower cost and ability of production on large scale. Commercially available bioglass is composed of silicon dioxide (SiO$_2$), calcium oxide (CaO), sodium oxide (Na$_2$O), and phosphorus pentoxide (P$_2$O$_5$), the components (Si$^{4+}$, Ca$^{2+}$, Na$^+$, P$^{5+}$) dissociated from which in the simulated body fluid stimulate the formation of new bone, and which has a greater ability to connect to bone and soft tissue than other synthetic materials. However, as a bone graft, the degradability of the bioactive glass is not good enough, and it needs to be used in cooperation with a bioceramic material (calcium sulfate) with higher degradability to promote the early regeneration of osteoblasts.

Among the existing artificial bone materials, there are still problems to be overcome in terms of whether they can provide the strength required for human bone restoration and rehabilitation, whether they can eventually be absorbed by the human body, and even whether they can promote the differentiation of human bone cells.

Therefore, the inventor of the present application came to the present invention after observing the above-mentioned issues.

SUMMARY OF THE INVENTION

For the above purposes, the present invention provides a glass-ceramic composite material with degradability and osteoconductivity, which is applied to living organisms and/or biological materials, and mainly comprises CaO—MgO—SiO$_2$ in glass phase, CaMgSi$_2$O$_6$ in crystalline phase and CaSO$_4$ in crystalline phase, wherein the CaMgSi$_2$O$_6$ in crystalline phase has high mechanical strength, biocompatibility and osteoconductivity, while the CaSO$_4$ in crystalline phase has the characteristics of rapid degradation to promote bone ingrowth.

Preferably, the ratios and steps of the synthesis process of the CaO—MgO—SiO$_2$ glass include: powder formulation, raw powder mixing, glass melting and powder fine grinding.

Preferably, the powder formulation step is conducted under a ratio of CaCO$_3$:Mg(OH)$_2$:SiO$_2$=25:25:50 mol %+8.5 wt % ZrO$_2$ (glass-ceramic nucleating agent).

In the raw powder mixing step, powder:ball:water (20: 60:20 wt %) are mixed at 180 rpm for 20 minutes, and sieved with a suitable sieve, and the powder is dried in an oven at 170° C.

In the glass melting step, the temperature is set at 1500° C. and maintained for 2 hours, and then the glass is quenched with water.

In the powder fine grinding step, powder:ball:water are mixed at a ratio (13:79:8 wt %) and fine-ground, for an appropriate time, to about 1 μm with a grinding machine, then sieved with a sieve, and the powder is dried in an oven at 170° C. to complete the production of the CaO—MgO—SiO$_2$ glass.

Next, the composite material of the present invention is used to synthesize porous scaffolds, and the ratios and steps thereof are as follows: firstly, slurries are prepared, in which CaO—MgO—SiO$_2$ (CMS glass) and calcium sulfate dihydrate (CaSO$_4$·2H$_2$O, abbreviated to CS2H) are chosen, these powders are formulated according to five weight ratios of CMS:CS2H=3:0, 2:1, 1:1, 1:2, 0:3, and powder:water: binder are stirred-mixed by a rotor (500 rpm, 5 min) with a weight ratio of 50:31.2:18.8; then sponges are soaked therein, in which a PU sponge is cut into 1.5 cm$^3$ with a hot melt wire, soaked with the slurry, and dried in an oven at 170° C.; finally, the sponges are sintered at 800-1300° C. for 2 hours to complete the synthesis of the porous scaffolds of the composite material of the CaO—MgO—SiO$_2$ glass+ CaMgSi$_2$O$_6$ ceramic and the CaSO$_4$ ceramic of the present invention.

For those skilled in the art to understand the purpose, features and effects of the present invention, the present invention is described in detail below by means of the following specific embodiments in conjunction with the appended drawings.

DETAILED DESCRIPTION OF THE PREFERRED EMBODIMENT

Figure 1:
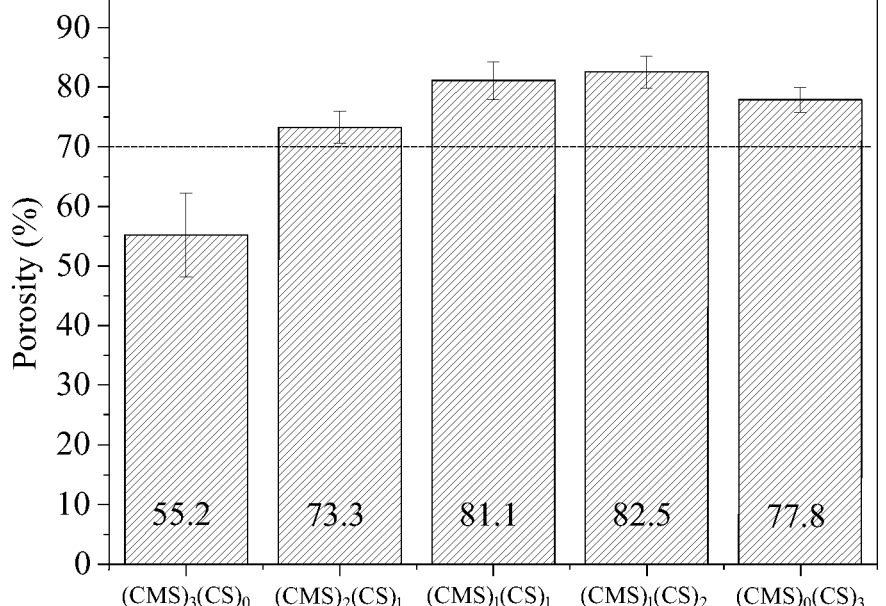
FIG. 1 is the characteristic experimental data diagram of the glass-ceramic composite material according to the present invention.

The glass-ceramic composite material of the present invention is composed of CaO—MgO—SiO$_2$ glass+

$CaMgSi_2O_6$ ceramic and $CaSO_4$ ceramic, and is applied to living organisms and/or biological materials. It can be found from the experiments that the advantage of the CS material, which is conventionally used in artificial bone materials, is rapid degradation to promote bone ingrowth, while the advantages of CMS in the glass-ceramic composite material of the present invention are high mechanical strength, high biocompatibility and high osteoconductivity, the present invention combines these two materials to form a glass-ceramic composite material.

The glass-ceramic composite material with degradability and osteoconductivity of the present invention mainly comprises CMS ($CaO$—$MgO$—$SiO_2$ in glass phase+ $CaMgSi_2O_6$ in crystalline phase) and CS ($CaSO_4$ in crystalline phase), wherein the $CaMgSi_2O_6$ in crystalline phase has high mechanical strength, biocompatibility and osteoconductivity, while the $CaSO_4$ in crystalline phase has the characteristics of rapid degradation to promote bone ingrowth.

Specifically, the ratios and steps of the synthesis process of the $CaO$—$MgO$—$SiO_2$ glass include: powder formulation, raw powder mixing, glass melting and powder fine grinding.

Specifically, the powder formulation step is conducted under a ratio of $CaCO_3$:$Mg(OH)_2$:$SiO_2$ (25:25:50 mol %)+8.5 wt % $ZrO_2$ (glass-ceramic nucleating agent).

In the raw powder mixing step, powder:ball:water (20: 60:20 wt %) are mixed at 180 rpm for 20 minutes, sieved with a sieve, and dried in an oven at 170° C.

In the glass melting step, the temperature is set at 1500° C. and maintained for 2 hours, and then the glass is quenched with water.

In the powder fine grinding step, powder:ball:water are mixed at a ratio (13:79:8 wt %) and fine-ground to about 1 μm with a grinding machine at 30 g/20 min, then sieved with a sieve, and the powder is dried in an oven at 170° C. to complete the production of the $CaO$—$MgO$—$SiO_2$ bioglass.

Next, the composite material of the present invention is used to synthesize porous scaffolds, and the ratios and steps thereof are as follows: firstly, slurries of $CaO$—$MgO$—$SiO_2$ glass and $CaSO_4$·$2H_2O$ ceramic are prepared, in which the powders are formulated according to five weight ratios of CMS:CS2H=3:0, 2:1, 1:1, 1:2, 0:3, and the slurries are formulated with a ratio of powder:water:binder=(50:31.25: 18.75 wt %), and stirred-mixed by a rotor (500 rpm, 5 min); then a PU sponge is soaked in the above slurries of different ratios, in which the sponge is cut into 1.5 cm³ with a hot melt wire, soaked with the slurries, and dried in an oven at 170° C.; finally, the sponges soaked with the slurries of different weight ratios (CMS:CS2H=3:0, 2:1, 1:1, 1:2) are sintered at 900° C. for 2 hours, while the sponge soaked with the slurry (the weight ratio of CMS:CS2H=0:3) is sintered at 1100° C. for 1 hour, thereby the synthesis of porous scaffolds of the composite material of the present invention is completed.

Specifically, the characteristics and data in the experiments for the composite material of the present invention are shown in FIGS. 1-6.

Regarding the porosity of the composite materials, it can be seen from FIG. 1 that, in the cases that the weight ratios of CMS:CS2H are 3:0, 2:1, 1:1, 1:2 and 0:3, respectively, except for the composite material containing only CMS, the porosity of each of the composite materials of the other ratios is greater than 70%, which meet the standard.

Figure 2:
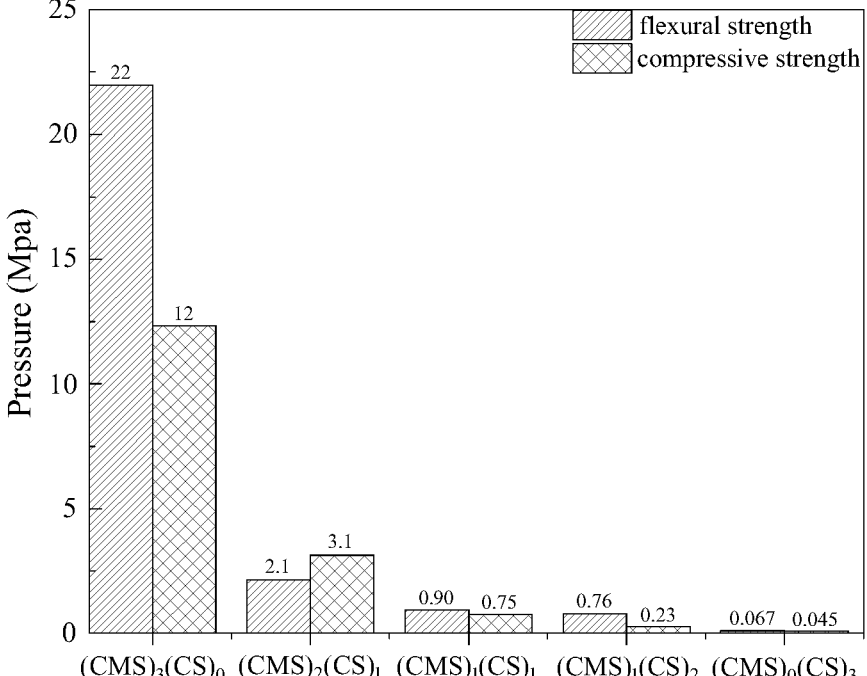
FIG. 2 is the characteristic experimental data diagram of the glass-ceramic composite material according to the present invention.
Figure 3:
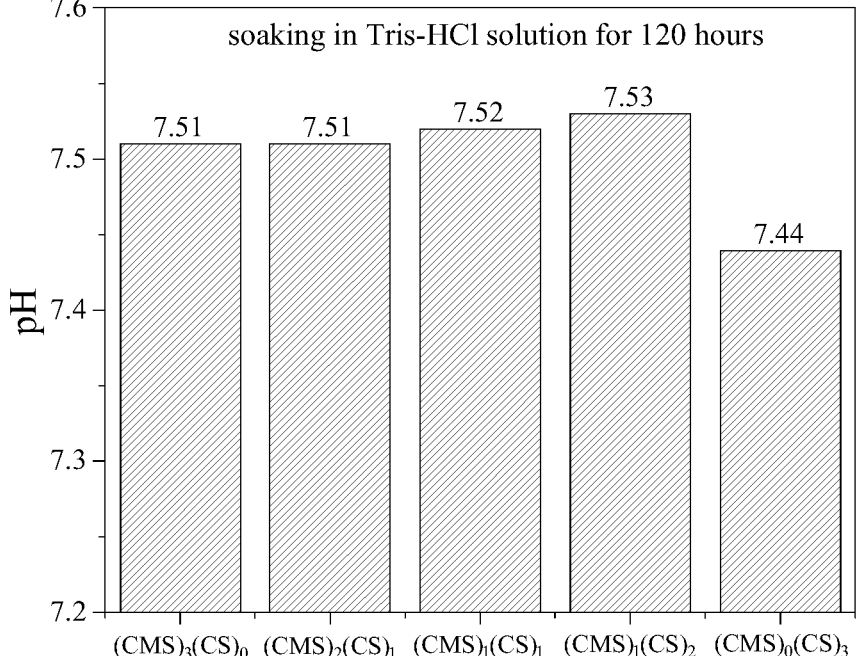
FIG. 3 is the characteristic experimental data diagram of the glass-ceramic composite material according to the present invention.
Figure 4:
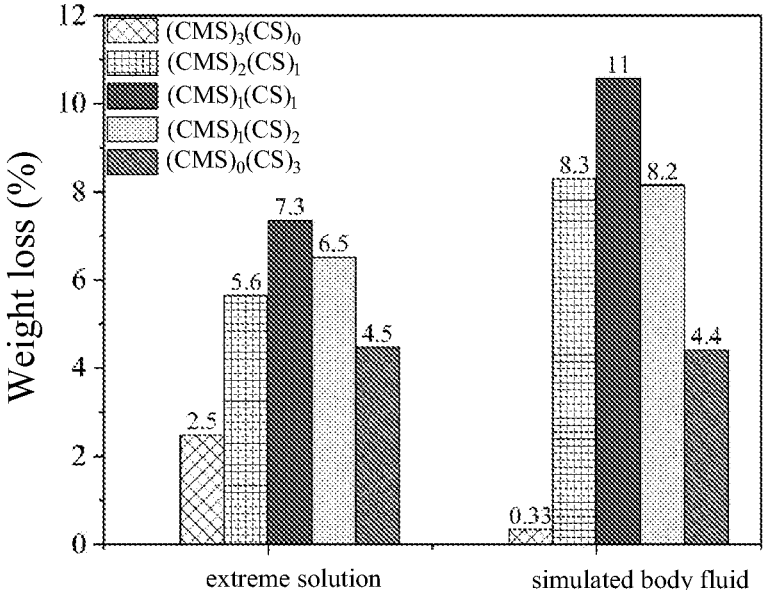
FIG. 4 is the characteristic experimental data diagram of the glass-ceramic composite material according to the present invention.

Regarding the mechanical strength of the composite materials, it can be seen from FIG. 2 that, in the cases that the weight ratios of CMS:CS2H are 3:0 and 2:1, respectively, the composite materials have better mechanical strength.

Regarding the pH value of the composite materials after degradation, a pH value between 7 and 8 is the most suitable for cell growth in terms of common sense or convention. Therefore, it can be seen from FIG. 3 that, in the cases that in the weight ratios of CMS:CS2H are 3:0, 2:1, 1:1, 1:2 and 0:3, respectively, after being soaked in a Tris-HCl solution for 120 hours, the pH value of each of the composite materials after degradation is between 7 and 8.

Regarding the measurement of weight loss of the composite material after degradation, if the weight lost due to the degradation is more, it means that more ions are released to help the growth of bone cells, and the effect is better. It can be seen from FIG. 4 that, in the cases that the weight ratios of CMS:CS2H are 3:0, 2:1, 1:1, 1:2 and 0:3, respectively, the composite materials of the present invention obviously has a greater weight loss under the condition of containing CS2H, that is, they has faster degradation rates, which can promote the early growth of bone cells into the bone material.

Figure 5:
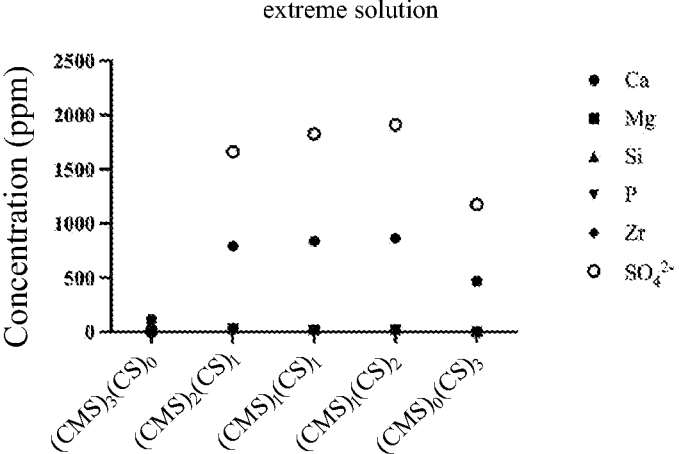
FIG. 5 is the characteristic experimental data diagram of the glass-ceramic composite material according to the present invention.
Figure 6:
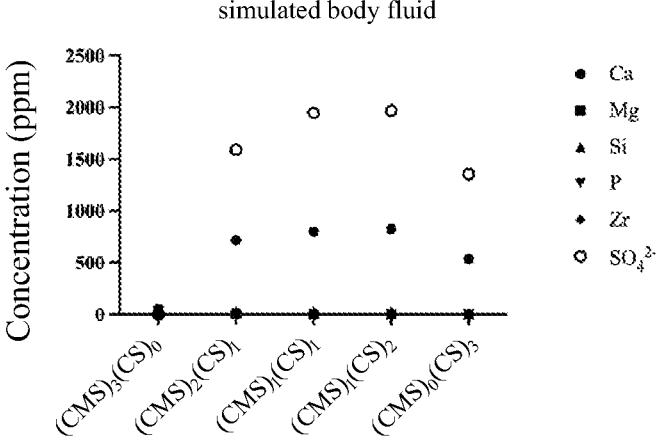
FIG. 6 is the characteristic experimental data diagram of the glass-ceramic composite material according to the present invention.

Regarding the experiments for the concentration of the ions released due to the degradation of the composite materials, it can be seen from FIGS. 5 and 6 that, in the cases that the weight ratios of CMS:CS2H are 3:0, 2:1, 1:1, 1:2 and 0:3, respectively, the composite materials will develop into $(CaO$—$MgO$—$SiO_2+CaMgSi_2O_6)_x(CaSO_4)_y$, which is abbreviated to $CMS_xCS_y$, and Ca, Mg, Si, and S ions are obtained after the degradation of $CMS_xCS_y$. It can be seen from FIG. 5 that in an extreme solution (citric acid solution), the CMS glass-ceramic has lower degradability, while the composite materials of CMS glass-ceramic containing CS calcium sulfate have higher degradability. It can be seen from FIG. 6 that in Tris-HCl simulated body fluid, the concentration of the ions released due to the degradation of CMS glass-ceramic is lower, so the composite materials containing CS calcium sulfate have higher degradability.

Specifically, the preferred weight ratio of CMS to CS in the glass-ceramic composite material is between 3:0 and 1:2.

Finally, the technical features of the present invention and their achievable technical effects are summarized as follows:

First, the biocompatibility is improved by the glass-ceramic composite material of the present invention.

Second, the glass-ceramic composite material according to the present invention degrades rapidly to promote bone ingrowth.

Third, the glass-ceramic composite material according to the present invention has high mechanical strength and high osteoconductivity.

The embodiments of the present invention are described above by means of specific embodiments, those skilled in the art can easily understand other advantages and effects of the present invention from the contents disclosed in this specification.

The above descriptions are only preferred embodiments of the present invention, but not intended to limit the scope of the present invention; all other equivalent changes or modifications made without departing from the spirit disclosed in the present invention shall be included in the scope of the appended claims.

What is claimed is:

1. A glass-ceramic composite material, comprising: $(CaO$—$MgO$—$SiO_2+CaMgSi_2O_6)_x(CaSO_4)_y$, wherein $CaO$—$MgO$—$SiO_2$ is in glass phase, the $CaMgSi_2O_6$ is in crystalline phase, the $CaSO_4$ is in crystalline phase, x and y are weight ratios and x:y is 2:1, 1:1 or 1:2.

* * * * *